Nov. 16, 1926.
W. G. HORN
1,606,837
INSULATED PIPE COUPLING
Filed Sept. 28, 1923
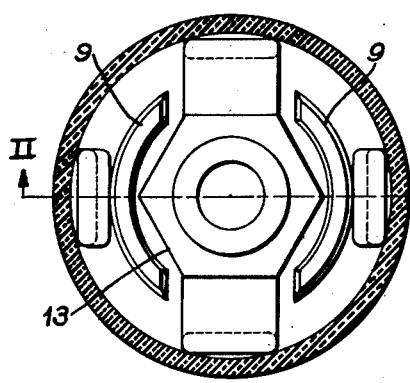
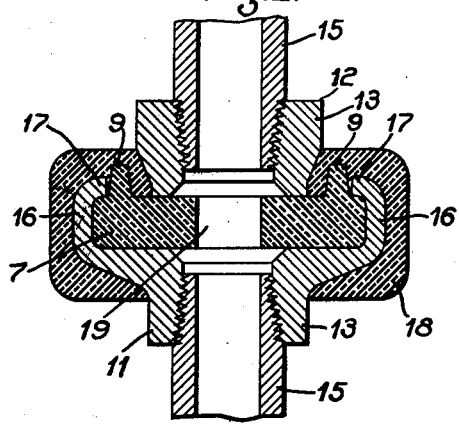
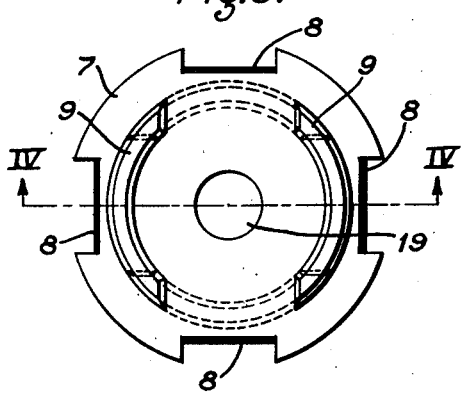
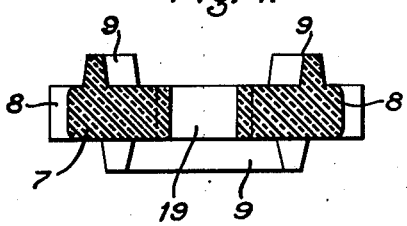
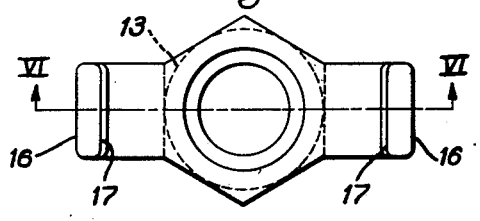
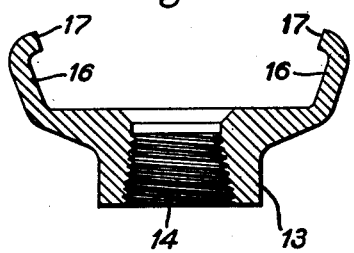
WITNESSES:
INVENTOR
William G. Horn.
BY
ATTORNEY Patented Nov. 16, 1926.

1,606,837

UNITED STATES PATENT OFFICE.

WILLIAM G. HORN, OF WILKINSBURG, PENNSYLVANIA, ASSIGNOR TO WESTINGHOUSE ELECTRIC & MANUFACTURING COMPANY, A CORPORATION OF PENNSYLVANIA.

INSULATED PIPE COUPLING.

Application filed September 28, 1923. Serial No. 665,349.

My invention relates to insulating couplings and particularly to insulated pipe couplings for mechanically connecting metal pipes or rods in such manner that they are electrically insulated from one another.

One object of my invention is to provide an insulating coupling or connector for pipes or rods that provides ample insulating capacity and which is of maximum physical strength for resisting separation of the pipes or rods.

Another object of my invention is to provide an insulating coupling or connector that is inexpensive to manufacture and which may be assembled with a minimum of labor.

Another object of my invention is to provide an insulating coupling or connector having the above characteristics wherein the metal attaching members of the connector are interlocked with an insulating disc in such manner that relative movement thereof is prevented and in such manner that they will withstand relatively large longitudinal and rotary stresses without failure.

A further object of my invention is to provide an insulating coupling that is compact and neat in appearance.

These and other objects that will be made apparent throughout the further description of my invention are attained by means of the coupling or connector hereinafter described and illustrated in the accompanying drawings wherein—

Figure 1 is a transverse sectional view of a connector or coupling embodying features of my invention, showing all parts except the insulating casing in elevation;

Fig. 2 is a longitudinal section through the coupling taken on the line II—II of Fig. 1;

Fig. 3 is a plan view of an insulating disc constituting a part of a coupling;

Fig. 4 is a vertical section through the insulating disc taken on the line IV—IV of Fig. 3;

Fig. 5 is an elevational view of one of the attaching members embodied in the coupling; and Fig. 6 is a vertical section through an attaching member taken on the line VI—VI of Fig. 5.

Referring to the drawings, the coupling includes an insulating disc 7 that is made of insulating material such as micarta or other insulating compound. The disc is provided with four equidistant peripheral notches 8 that extend from one face of the disc to the other and with a pair of arcuate ridges 9 on each face of the disc. The ridges 9 on one side of the disc are disposed adjacent to diametrically opposite notches 8 and the ridges on the opposite side of the disc are disposed adjacent to the remaining notches. The purpose of the ridges will hereinafter appear.

The coupling also includes a pair of attaching members 11 and 12 that are identical in construction, each comprising a hub or shank portion 13 that is provided with a threaded bore 14 for receiving the threaded ends of the pipes or rods 15 that are to be connected. Each attaching member is provided with integral gripping fingers 16 having inwardly directed tip portions 17 that are adapted to be bent into engagement with the side of the insulating disc 7 that is opposite to that on which the attaching member is applied, the fingers 16 being adapted to enter the notches 8. The attaching members are preferably made of malleable iron or other metal in order that the attaching fingers 16, which originally occupy the position indicated in Fig. 6, may be bent into engagement with the insulating disc 7 in the manner indicated in Fig. 2.

As indicated in Figs. 1 and 2, the fingers 16 of the attaching member 11 engage one pair of oppositely disposed notches 8 while the fingers 16 of the attaching member 13 engage the other notches 8 of the insulating disc 7. The ridges 9 are provided to increase the creepage distance between the tip portions 17 of the fingers 16 and the adjacent hub portion of the other attaching member. It will be seen that when the attaching members 11 and 12 have been assembled upon the insulating disc 7 that longitudinal displacement thereof is prevented by the tip portions and that relative rotary movement thereof is prevented by the notches 8 in which the fingers are disposed.

When the attaching members have been assembled upon the disc 7, they are placed in a suitable mold in order that an insulating casing 18 may be applied which completely surrounds the disc member and the fingers 16, as indicated in Figs. 1 and 2. All of the attaching members 11 and 12 are embedded in the insulating casing 18 except the outer hub portions 13 which are hexagonal in shape and are adapted to receive a wrench for holding the coupling while the pipe 15 is being connected thereto. Where the coupling is to be used for connecting pipes, such as gas pipes, the insulating disc 7 is provided with an opening 19 of substantially the same diameter as the bore of the pipes for permitting free flow of liquid or gases therethrough.

Insulators of this character may be employed for mounting electrical fixtures upon brackets for insulating the fixture from the bracket. In this event, one attaching member is attached to a threaded stud on the bracket and a threaded rod on the electrical fixture is connected to the other attaching member. In such applications where there is no necessity for passing liquids or gases through the connector, the opening 19 may be omitted.

It will be apparent that the coupling made in accordance with the drawings provides maximum insulating capacity as well as mechanical strength and that the coupling is compact and neat in appearance.

Although I have shown but one embodiment of my invention it will be apparent to those skilled in the art that various modifications, changes, substitutions, additions and omissions may be made in the apparatus illustrated without departing from the spirit and scope of my invention, as set forth in the appended claims.

I claim as my invention:

1. An insulating connector for metal members comprising a disc member of insulating material, a pair of metal attaching members mounted on opposite sides of the disc member and having inwardly turned portions engaging the sides of the disc opposite to that on which the attaching members are mounted, the said disc being provided with ridges adjacent the said portions for increasing the creepage area between the attaching members and molded insulation material surrounding and encasing the said insulating disc and the portions of the attaching member connected thereto.

2. An insulating connector for metal members comprising a disc member made of insulating material and having peripheral notches and spaced arcuate ridges in the sides of the disc adjacent to the notches for increasing the creepage area and attaching members for receiving the said metal members, each having a pair of gripping fingers for engaging the said notches and provided with inwardly turned portions for gripping the sides of the disc opposite to that on which the attaching member is mounted, and insulation surrounding and encasing the said disc and gripping fingers.

3. In an insulating connector, the combination with a pair of attaching members, each having a pair of gripping fingers adapted to inter-mesh with the other attaching member and in spaced relation, of an insulating disc disposed between the attaching members and provided with an insulating ridge adjacent the ends of the fingers for increasing the creepage area between the attaching members, and interlocked therewith for preventing longitudinal separation thereof and insulation surrounding and encasing the disc and gripping fingers.

4. In an insulating connector, the combination with a pair of attaching members, each having a pair of gripping fingers adapted to inter-mesh with the other attaching member and in spaced relation, of an insulating disc disposed between the attaching members and interlocked therewith for preventing longitudinal separation thereof and provided with ridges opposite each gripping finger for increasing the creepage distance between the end thereof and the opposite attaching member and insulation surrounding and encasing the disc and gripping fingers.

In testimony whereof, I have hereunto subscribed my name this 18th day of September 1923.

WILLIAM G. HORN.